US012254388B2

(12) United States Patent
McGrath et al.

(10) Patent No.: US 12,254,388 B2
(45) Date of Patent: Mar. 18, 2025

(54) GENERATION OF COUNTERFACTUAL EXPLANATIONS USING ARTIFICIAL INTELLIGENCE AND MACHINE LEARNING TECHNIQUES

(71) Applicant: Accenture Global Solutions Limited, Dublin (IE)

(72) Inventors: Rory McGrath, Kildare Town (IE); Luca Costabello, Newbridge (IE); Nicholas McCarthy, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 973 days.

(21) Appl. No.: 16/949,365

(22) Filed: Oct. 27, 2020

(65) Prior Publication Data
US 2022/0129794 A1    Apr. 28, 2022

(51) Int. Cl.
    *G06N 20/10* (2019.01)
    *G06F 16/23* (2019.01)
    *G06N 5/045* (2023.01)

(52) U.S. Cl.
    CPC ......... *G06N 20/10* (2019.01); *G06F 16/2379* (2019.01); *G06N 5/045* (2013.01)

(58) Field of Classification Search
    CPC ..... G06N 20/10; G06N 5/045; G06F 16/2379
    See application file for complete search history.

(56) References Cited

U.S. PATENT DOCUMENTS

| | | | | |
|---|---|---|---|---|
| 8,661,029 | B1* | 2/2014 | Kim | G06F 16/24578 |
| | | | | 707/723 |
| 8,996,437 | B2* | 3/2015 | Brillhart | G06N 5/022 |
| | | | | 706/46 |
| 10,637,715 | B1* | 4/2020 | Vasilyev | H04L 41/065 |
| 11,049,590 | B1* | 6/2021 | Lee | G06N 3/08 |
| 11,107,117 | B1* | 8/2021 | Calabrese | G06Q 30/0246 |
| 11,176,465 | B2* | 11/2021 | Hazard | G06F 18/2415 |
| 11,379,747 | B1* | 7/2022 | Richens | G16H 50/70 |
| 11,531,694 | B1* | 12/2022 | Barrientos | G06N 3/0442 |
| 11,531,887 | B1* | 12/2022 | Nair | G06N 3/09 |

(Continued)

OTHER PUBLICATIONS

Russell et al., "Learning Relevant Explanations," WHI 2020, 7 Pages.

*Primary Examiner* — Jeremy L Stanley
(74) *Attorney, Agent, or Firm* — Polsinelli PC

(57) ABSTRACT

In some implementations, a system may determine, based on a qualification model, a prediction output of an analysis of user information. The system may determine, based on a generator model, a plurality of counterfactual explanations associated with the prediction output and the user information. The system may cluster, according to a clustering model, the plurality of counterfactual explanations into clusters of counterfactual explanations. The system may select, based on a classification model, a counterfactual explanation from a cluster of the clusters of counterfactual explanations. The system may provide a request for feedback associated with the counterfactual explanation. The system may receive feedback data associated with the request for feedback. The system may update a data structure associated with the clustering model based on the feedback data and the counterfactual explanation to form an updated data structure. The system may perform an action associated with the updated data structure.

20 Claims, 8 Drawing Sheets

(56) References Cited

U.S. PATENT DOCUMENTS

| | | | |
|---|---|---|---|
| 11,556,773 B1* | 1/2023 | Aggarwal | G06Q 30/0242 |
| 11,568,286 B2* | 1/2023 | Nourian | G06N 5/045 |
| 11,710,139 B1* | 7/2023 | Wan | G06Q 30/0631 |
| | | | 705/14.54 |
| 11,762,950 B1* | 9/2023 | Stupp | G06F 18/231 |
| | | | 706/12 |
| 11,790,268 B1* | 10/2023 | Wick | G06Q 30/0211 |
| | | | 706/12 |
| 2006/0167917 A1* | 7/2006 | Solomon | G05B 19/418 |
| 2008/0147574 A1* | 6/2008 | Chidlovskii | G06F 16/35 |
| | | | 706/12 |
| 2017/0046626 A1* | 2/2017 | Dua | G06N 20/00 |
| 2017/0308609 A1* | 10/2017 | Berkhin | G06F 16/951 |
| 2018/0039946 A1* | 2/2018 | Bolte | G06Q 50/2057 |
| 2018/0314835 A1* | 11/2018 | Dodson | H04L 63/1425 |
| 2018/0314965 A1* | 11/2018 | Dodson | G06N 20/00 |
| 2018/0316707 A1* | 11/2018 | Dodson | H04L 43/16 |
| 2019/0228098 A1* | 7/2019 | Daly | G06N 3/042 |
| 2019/0332957 A1* | 10/2019 | Malur Srinivasan | G06N 5/045 |
| 2019/0334942 A1* | 10/2019 | Wicker | H04L 63/1433 |
| 2019/0362242 A1* | 11/2019 | Pillai | G06N 5/01 |
| 2020/0097997 A1* | 3/2020 | Li | G06N 20/00 |
| 2020/0118041 A1* | 4/2020 | Bettencourt-Silva | |
| | | | G06N 5/048 |
| 2020/0134420 A1* | 4/2020 | Spooner | H04W 4/023 |
| 2020/0134484 A1* | 4/2020 | Hazard | G06N 5/025 |
| 2020/0250557 A1* | 8/2020 | Kishimoto | G06N 5/045 |
| 2020/0279182 A1* | 9/2020 | So | G06N 20/00 |
| 2020/0293933 A1* | 9/2020 | Ghosh | G06F 18/24147 |
| 2020/0301805 A1* | 9/2020 | Cao | G06F 11/3688 |
| 2020/0363794 A1* | 11/2020 | Schuster | G06N 5/04 |
| 2020/0402658 A1* | 12/2020 | Tomsett | G06N 3/08 |
| 2021/0043194 A1* | 2/2021 | Krishnamurthy | G10L 15/22 |
| 2021/0049460 A1* | 2/2021 | Ahn | G06N 3/045 |
| 2021/0059615 A1* | 3/2021 | Nakamura | A61B 5/024 |
| 2021/0064517 A1* | 3/2021 | Wong | G06F 11/3688 |
| 2021/0073291 A1* | 3/2021 | Hunter | H04L 63/123 |
| 2021/0110287 A1* | 4/2021 | Perov | G06N 7/01 |
| 2021/0117508 A1* | 4/2021 | Chang | G06F 17/18 |
| 2021/0117772 A1* | 4/2021 | Chang | G06N 3/045 |
| 2021/0117784 A1* | 4/2021 | Flinn | G06N 3/08 |
| 2021/0142253 A1* | 5/2021 | Cohen | G06Q 30/0202 |
| 2021/0158075 A1* | 5/2021 | Shoshan | G06V 10/776 |
| 2021/0158085 A1* | 5/2021 | Budzik | G06N 20/00 |
| 2021/0232940 A1* | 7/2021 | Dalli | G06N 3/08 |
| 2021/0241865 A1* | 8/2021 | Bhattacharya | G06Q 10/067 |
| 2021/0241923 A1* | 8/2021 | Foschini | G16H 50/30 |
| 2021/0256319 A1* | 8/2021 | Dana | G06N 20/00 |
| 2021/0295427 A1* | 9/2021 | Shiu | G06N 5/04 |
| 2021/0304002 A1* | 9/2021 | George | G06N 3/047 |
| 2021/0319158 A1* | 10/2021 | Bhattacharyya | G06F 30/12 |
| 2021/0326661 A1* | 10/2021 | Munoz Delgado | |
| | | | G06F 18/2113 |
| 2021/0357704 A1* | 11/2021 | Lustenberger | G06V 10/7784 |
| 2021/0374516 A1* | 12/2021 | Chozhiyath Raman | |
| | | | G06N 5/045 |
| 2021/0406723 A1* | 12/2021 | Hintz | G06F 16/334 |
| 2022/0004824 A1* | 1/2022 | Munoz Delgado | G06F 18/22 |
| 2022/0005604 A1* | 1/2022 | Son | A61B 5/7246 |
| 2022/0012591 A1* | 1/2022 | Dalli | G06N 3/082 |
| 2022/0027679 A1* | 1/2022 | Jesus | G06F 18/2178 |
| 2022/0027777 A1* | 1/2022 | Schmidt | G06N 5/01 |
| 2022/0059196 A1* | 2/2022 | Lee | G06N 3/047 |
| 2022/0067511 A1* | 3/2022 | Goldman-Shenhar | |
| | | | G06V 10/82 |
| 2022/0083871 A1* | 3/2022 | Nemirovsky | G06N 3/088 |
| 2022/0093234 A1* | 3/2022 | Shima | A61B 5/743 |
| 2022/0114399 A1* | 4/2022 | Castiglione | G06V 10/751 |
| 2022/0114417 A1* | 4/2022 | Dalli | G06N 3/042 |
| 2022/0114456 A1* | 4/2022 | Nouri | G06F 18/214 |
| 2022/0130143 A1* | 4/2022 | Rodriguez Lopez | |
| | | | G06V 10/776 |
| 2022/0147819 A1* | 5/2022 | Lawrence | G06F 18/211 |
| 2022/0147876 A1* | 5/2022 | Dalli | G06N 20/00 |
| 2022/0172146 A1* | 6/2022 | Zillner | G06N 3/08 |
| 2022/0215242 A1* | 7/2022 | Shalev | G06N 7/01 |
| 2022/0222554 A1* | 7/2022 | Liu | G06N 3/047 |
| 2022/0231939 A1* | 7/2022 | Mermoud | H04L 41/5025 |
| 2022/0318831 A1* | 10/2022 | Marvaniya | G06F 16/90332 |
| 2022/0374558 A1* | 11/2022 | Patel | G06F 30/12 |
| 2022/0375551 A1* | 11/2022 | Patel | G06N 5/04 |
| 2022/0382935 A1* | 12/2022 | Patel | G06F 30/20 |
| 2022/0405775 A1* | 12/2022 | Siebel | G06Q 30/01 |
| 2023/0049574 A1* | 2/2023 | Hazard | G06N 5/04 |
| 2023/0142625 A1* | 5/2023 | Lawrence | A61B 5/167 |
| | | | 706/12 |
| 2023/0147985 A1* | 5/2023 | Totsuka | G06N 3/045 |
| | | | 706/12 |
| 2023/0153857 A1* | 5/2023 | Li | G06Q 30/0202 |
| | | | 705/14.49 |
| 2023/0162004 A1* | 5/2023 | Pan | G06N 3/045 |
| | | | 702/1 |
| 2023/0214695 A1* | 7/2023 | Wu | G06F 18/24 |
| | | | 706/46 |
| 2023/0229944 A1* | 7/2023 | Otieno | G06Q 10/08 |
| | | | 706/45 |
| 2023/0260342 A1* | 8/2023 | Alonso Baigorri | G07C 5/008 |
| | | | 701/29.3 |
| 2023/0260665 A1* | 8/2023 | Swisher | G16H 50/70 |
| | | | 705/2 |
| 2023/0274003 A1* | 8/2023 | Liu | G06F 21/577 |
| | | | 726/26 |
| 2023/0325678 A1* | 10/2023 | Fradkin | G06N 20/20 |
| | | | 706/25 |
| 2023/0334359 A1* | 10/2023 | Davin | G06N 7/01 |
| 2023/0376529 A1* | 11/2023 | McInerney | G06F 16/637 |

\* cited by examiner

GENERATION OF COUNTERFACTUAL EXPLANATIONS USING ARTIFICIAL INTELLIGENCE AND MACHINE LEARNING TECHNIQUES

BACKGROUND

One or more systems may be configured to make decisions and/or provide an analysis based on a given set of data. For example, such a system may be used to qualify an entity (e.g., an individual, an organization, and/or a platform, among other examples) according to one or more thresholds, requirements, or standards. In such a case, when the system determines that the entity is not qualified, the system can provide a counterfactual explanation that describes a scenario in which the entity would have qualified.

SUMMARY

In some implementations, a method includes receiving user information; determining, based on a prediction model, a prediction output of an analysis of the user information; determining, based on a generator model, a plurality of counterfactual explanations associated with the prediction output and the user information, wherein the generator model is trained based on a plurality of labeled counterfactuals associated with historical outputs of the analysis; clustering, according to a clustering model, the plurality of counterfactual explanations into clusters of counterfactual explanations; selecting, based on a classification model, a counterfactual explanation from a cluster of the clusters of counterfactual explanations based on the prediction output and a relevance score of the counterfactual explanation, wherein the relevance score is determined based on the user information and a confidence score associated with the clustering of the plurality of counterfactual explanations and a confidence score associated with the prediction model; providing a request for feedback associated with the counterfactual explanation; receiving feedback data associated with the request for feedback; updating a data structure associated with the clustering model based on the feedback data and the counterfactual explanation to form an updated data structure; and performing an action associated with the updated data structure.

In some implementations, a device includes one or more memories; and one or more processors, communicatively coupled to the one or more memories, configured to: receive user information and a prediction output of an analysis of the user information; generate, based on the user information and the prediction output, a plurality of counterfactual explanations associated with the prediction output; cluster, according to a clustering model, the plurality of counterfactual explanations into clusters of counterfactual explanations; identify, in a cluster of the clusters of counterfactual explanations, an unlabeled counterfactual explanation; determine, based on a classification model, a relevance score of the unlabeled counterfactual explanation based on the user information and a confidence score associated with the cluster; select, based on the relevance score satisfying a relevance threshold, the unlabeled counterfactual explanation for updating the clustering model; provide the unlabeled counterfactual explanation to a user device; receive, from the user device, feedback data associated with the unlabeled counterfactual explanation; generate a labeled counterfactual explanation that is based on the feedback data and the unlabeled counterfactual explanation; and perform an action associated with the labeled counterfactual explanation.

In some implementations, a non-transitory computer-readable medium storing a set of instructions includes one or more instructions that, when executed by one or more processors of a device, cause the device to: receive training data associated with determining a label for a counterfactual explanation that is associated with an analysis of a prediction model, wherein a training set of the training data includes first user information and a first prediction output of the prediction model that is based the first user information; determining, based on the training set, a labeled counterfactual explanation associated with the first prediction output by: determining, based on the first user information, a plurality of counterfactual explanations associated with the first prediction output, clustering, according to a clustering model, the plurality of counterfactual explanations into clusters, determining, according to a classification model, a relevance score of a counterfactual explanation based on a confidence score of the prediction output (e.g., a confidence score associated with the prediction model determining the prediction output) and a cluster of the counterfactual explanation, obtaining feedback data associated with the counterfactual explanation, and labelling, based on the feedback data, the counterfactual explanation to generate the labeled counterfactual explanation; storing the labeled counterfactual explanation in a data structure; determine, based on storing the labeled counterfactual explanation in the data structure, that the data structure includes a threshold quantity of labeled counterfactual explanations; and train, based on the labeled counterfactual explanations, a machine learning model to generated a trained machine learning model that determines optimal counterfactual explanations for subsequent prediction outputs of the prediction model; receive, from a user device, second user information and a second prediction output of the prediction model; determine an optimal counterfactual explanation according to the trained machine learning model; and provide, to the user device, the optimal counterfactual explanation.

DETAILED DESCRIPTION

Figure 1A:
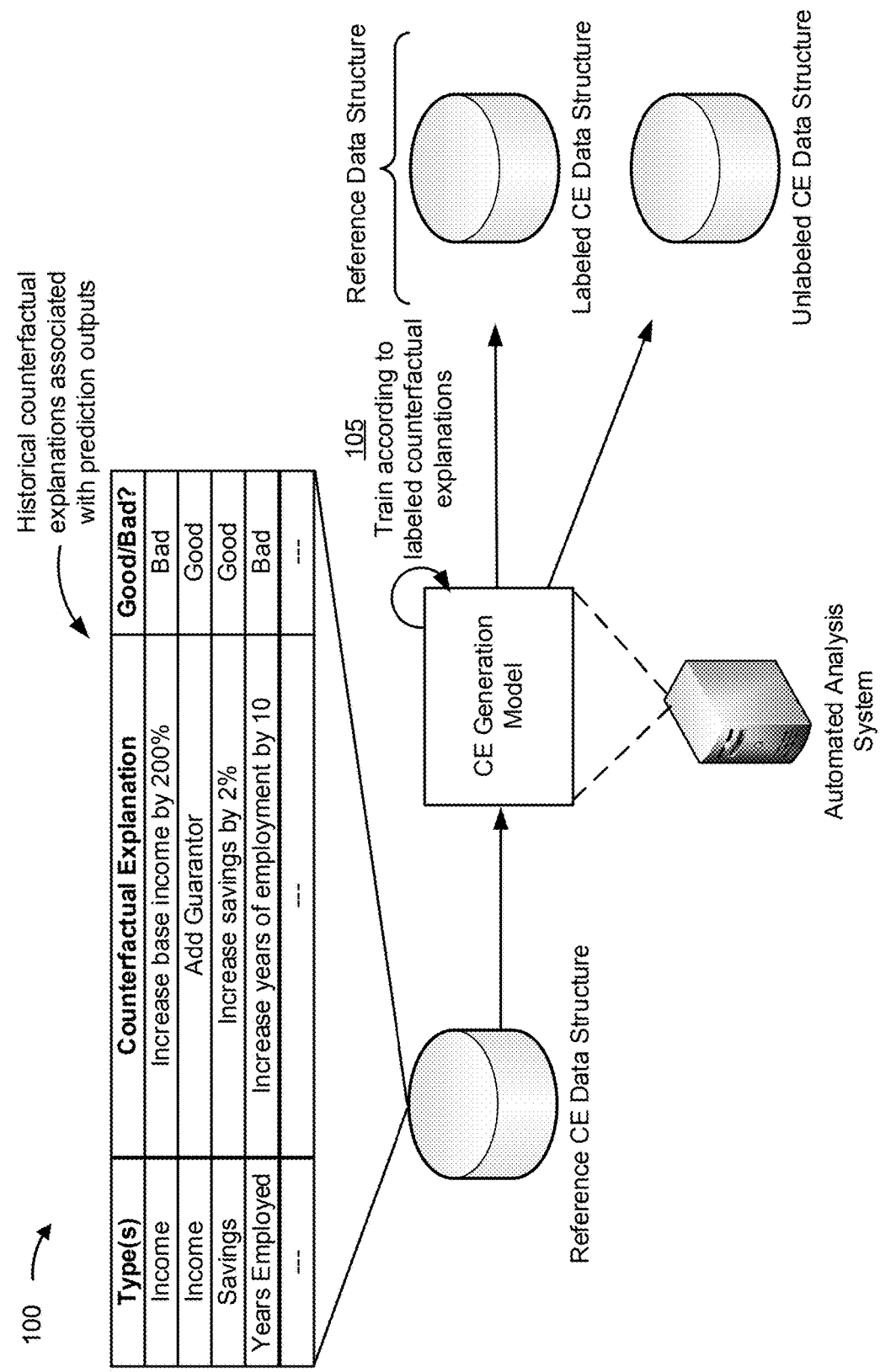
FIGS. 1A-1C are diagrams of example implementations described herein.

The following detailed description of example implementations refers to the accompanying drawings. The same reference numbers in different drawings may identify the same or similar elements.

Counterfactual explanations can be provided in association with a decision from an automated analysis system (e.g., an automated analysis system configured to indicate whether an entity is qualified to receive a particular service or product). However, many counterfactual explanations provided by such a system may provide scenarios that are infeasible, and therefore, irrelevant to an individual seeking a qualification associated with the automated analysis system. For example, if an individual does not qualify to receive a telecommunication service in a particular unit of a building, a counterfactual explanation stating "relocate to a different floor to receive the desired telecommunication service" may be infeasible, but a counterfactual explanation for the same request stating "purchase a device to extend available service to the unit" would be more feasible. Some automated analysis systems may be updated and/or trained based on receiving feedback (e.g., from an operator of the automated analysis system) associated with these infeasible counterfactual explanations. However, providing such infeasible counterfactual explanations to a user and/or operator, which may also degrade a user experience associated with using the automated analysis system, wastes computing resources (e.g., processor resources, memory resources, and/or the like) and/or communication resources by processing, generating, and providing such infeasible counterfactual explanations to the user.

Some implementations described herein provide an automated analysis system that is configured to receive user information and a prediction of an analysis (e.g., a qualification analysis), determine a plurality of counterfactual explanations based on a prediction output and the user information, and select a subset of counterfactual explanations (e.g., one or more of the most relevant counterfactual explanations) for training one or more models of the automated analysis system (e.g., a generator model, a clustering model, a classification model) based on feedback associated with the one or more counterfactual explanations. The feedback may be used to label counterfactual explanations that can be used to train a machine learning model (e.g., a deep learning model, a generative adversarial network, a sequence-to-sequence learning model or the like) to automatically determine one or more optimal counterfactual explanations for a prediction output based on user information associated with the prediction output.

In this way, the automated analysis system may conserve computing resources and/or communication resources associated with training an automated system by providing a most relevant set of counterfactual explanations for prediction outputs obtained during a training period, which reduces a quantity of needed feedback to improve the automated analysis system.

Figure 1B:
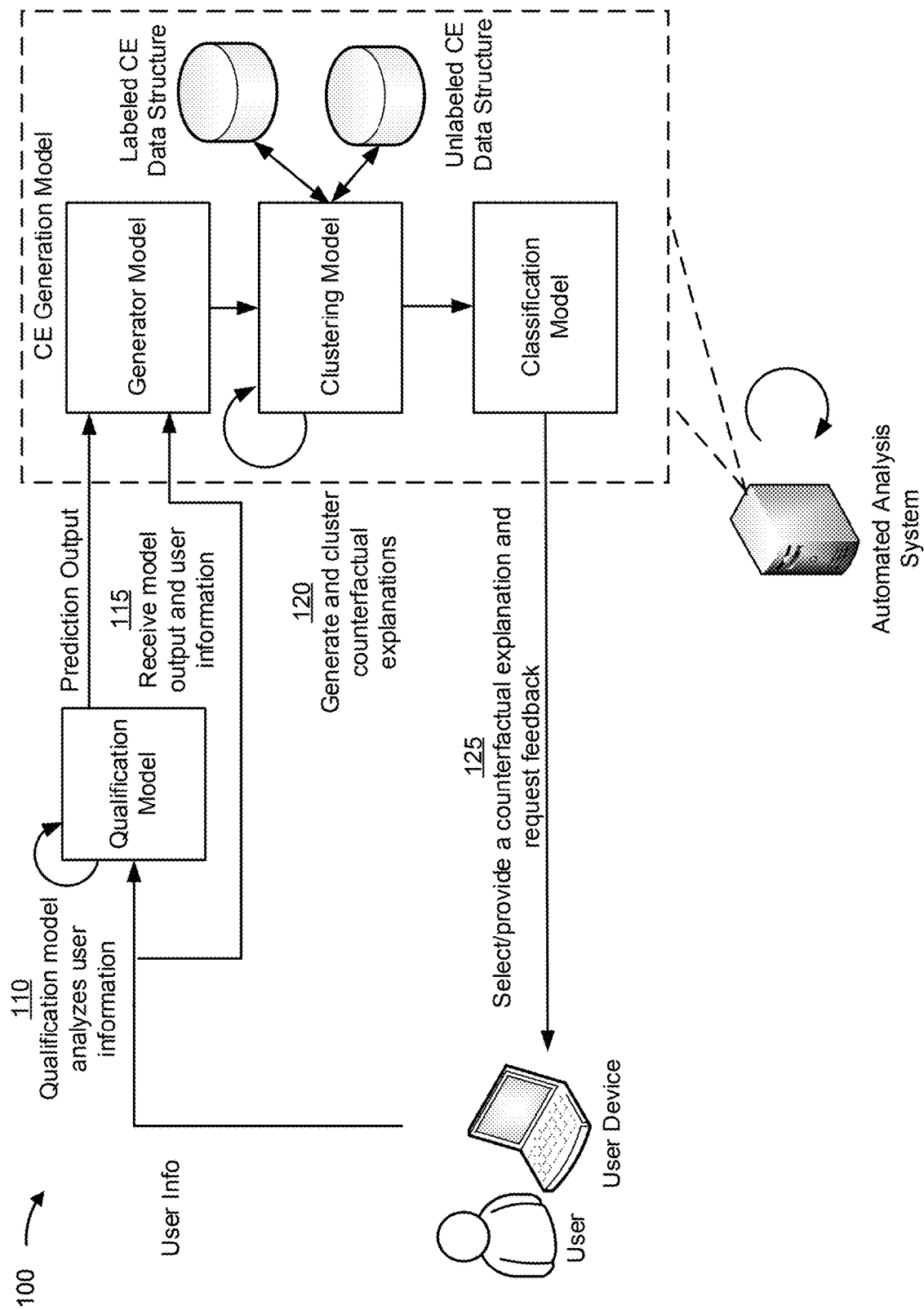
Figure 1C:
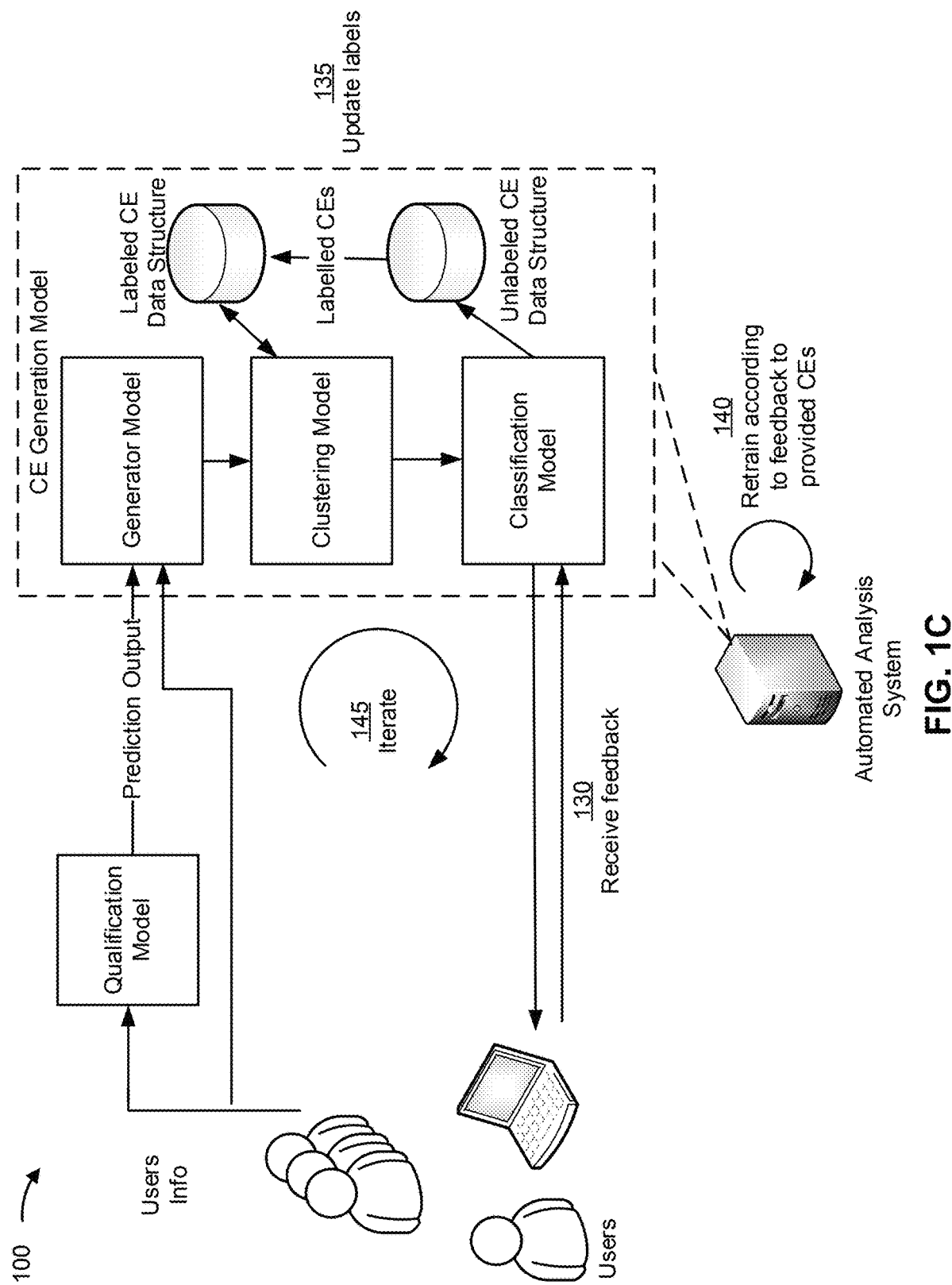

FIGS. 1A-1C are diagrams of an example 100 associated with generating counterfactual explanations as described herein. As shown in FIGS. 1A-1C, example 100 includes an automated analysis system and one or user devices. In example 100, the automated analysis system includes and/or is associated with a production model and a counterfactual explanation generation model. The counterfactual explanation generation model includes a generator model, a clustering model, and a generating model.

As shown in FIG. 1A, and by reference number 105, the counterfactual explanation generation model is initially trained according to reference counterfactual explanations. For example, the labeled counterfactual explanations may be associated with reference counterfactual explanations (e.g., historical labeled or unlabeled counterfactual explanations) generated for prediction outputs of the qualification model. The counterfactual explanation generation model may be configured to store and/or maintain the labeled counterfactual explanations in the labeled counterfactual explanation data structure and unlabeled counterfactual explanations in an unlabeled counterfactual explanation data structure.

As shown, the reference counterfactuals may be labeled as "good" (e.g., feasible, usable, relevant, and/or the like) or "bad" (e.g., infeasible, unusable, irrelevant, and/or the like). As described herein, an unlabeled counterfactual may be unlabeled in that the counterfactual is not known to be relevant, feasible, or useful as a counterfactual explanation for a prediction output. However, such counterfactual explanations may be generated in association with the qualification model according to any suitable techniques (e.g., using natural language processing, a generative model based on parameters of the qualification model, and/or the like).

In this way, the counterfactual explanation generation model may be initially trained according to known, historical, and/or a reference set of counterfactual explanations to permit the counterfactual explanation generation model to be trained and/or updated according to feedback for sets of relevant counterfactual explanations, as described herein.

As shown in FIG. 1B, and by reference number 110, the qualification model analyzes user information. For example, the qualification model may receive user information from the user device and the user information may be associated with a user. The qualification model may be configured to qualify the user for a service (e.g., a technological service, a financial service, a transportation service, and/or the like) or product (e.g., a media-based product, a consumer good, or the like) according to the user information using any suitable technique. For example, to qualify for a telecommunication service at a particular location, the user information may include an address of the user, financial information of the user, a desired level of service of the user, and/or the like. As another example, for a loan application, the user information may include income of the user, debt of the user, credit rating of the user, assets of the user, an amount of the loan, and/or the like. The qualification model may determine, predict, and/or indicate whether the user is qualified for the service or product based on one or more parameters of the user information and one or more parameters of the service and/or product. In some implementations, the qualification model may determine and/or indicate a confidence score associated with a prediction of whether the user is qualified. The confidence score may correspond to the probability that the user is qualified or is not qualified, according to the prediction model.

In this way, qualification model may perform an analysis of the user information and provide an output (which may be referred to herein as a "prediction output") to the counterfactual explanation generation model.

As further shown in FIG. 1B, and by reference number 115, the counterfactual explanation generation model receives, via the generator model, the user information and the prediction output. The user information and/or prediction output may be received during a training period to train one or more of the generator model, the clustering model, and/or the classification model to label counterfactual explanations, according to examples described herein. After the training period, the labeled counterfactuals may be used to train a machine learning model to determine optimal counterfactual explanations for a prediction output of the qualification.

The prediction output may include an indication of a qualification of the user and/or a confidence score associated with the prediction model performing an analysis of the user information. As described herein, the prediction output includes an indication that the user information does not qualify the user for the service or product associated with the qualification model (e.g., one or more parameters of the user information does not qualify one or more corresponding thresholds for the one or more parameters). Based on the user information not qualifying, the qualification model may cause the counterfactual explanation generation model to determine a set of counterfactual explanations that are to be provided to the user (and/or an operator), receive feedback data from the user that is associated with the set of counterfactual explanations, and/or train the counterfactual explanation generation model based on the set of counterfactual explanations and the feedback data, as described herein.

In this way, the counterfactual explanation generation model may receive the user information and prediction output to permit the generator model to generate a plurality of counterfactual explanations.

As further shown in FIG. 1B, and by reference number 120, the counterfactual explanation generation model generates (e.g., via the generator model) and clusters (e.g., via the clustering model) counterfactual explanations associated with the prediction output. For example, the generator model may be configured to convert counterfactuals associated with parameters of the user information and qualification model to text versions of the counterfactuals, referred to herein as "counterfactual explanations." The generator model may use any suitable technique (e.g., natural language processing, vector conversion, and/or the like) to convert data representative of counterfactuals of the parameters to counterfactual explanations.

In some implementations, the generator model is trained based on a reference counterfactual explanation data structure. For example, the generator model may identify reference parameters of corresponding counterfactual explanations in the reference counterfactual explanation data structure to the parameters of the user information to determine and/or generate a plurality of counterfactual explanations for the prediction output of the qualification model.

The clustering model may cluster the plurality of counterfactual explanations into corresponding clusters. For example, the clusters may be based on labels of the counterfactual explanations, whether the counterfactual explanations are labeled or unlabeled, similarity of values of parameters associated with the counterfactual explanations, similarity of types of parameters associated with the counterfactual explanations, and/or the like. The clustering model may utilize a k-means nearest neighbor (KNN) technique to cluster the plurality of counterfactual explanations.

In this way, the generator model and/or clustering model may generate and cluster the plurality of counterfactual explanations to permit the counterfactual explanation generation model to select one or more counterfactual explanations for analysis and/or feedback by one or more of the users.

As further shown in FIG. 1B, and by reference number 125, the counterfactual explanation generation model selects and provides a counterfactual explanation to the user device along with a request for feedback. Additionally, or alternatively, the counterfactual explanation generation model may provide the selected counterfactual explanation to another device. For example, the counterfactual explanation generation model may provide the counterfactual explanation to a device associated with an operator of the automated analysis system that manages updates or training of the counterfactual explanation generation model to determine labeled counterfactual explanations.

The request for feedback may be provided to the user (and/or operator) via a message, a prompt, and/or the like. The request for feedback may request the user to indicate whether the provided counterfactual explanation is feasible, usable, relevant, and/or the like. In some implementations, the request for feedback may request feedback according to a scale that is representative of feasibility, usability, relevance, and/or the like.

As described herein, the classification model may include and/or be associated with a support vector machine (SVM) classifier that is configured to determine relevance scores associated with one or more of the counterfactual explanations. For example, the classification model may identify a cluster of unlabeled counterfactual explanations that were generated for the prediction output and determine a relevance score for the unlabeled counterfactual explanations that is based on whether labels for the counterfactual explanations would improve the clustering model. The relevance score may correspond to a confidence score that is representative of a probability (or confidence level) that the counterfactual explanation is associated with a particular label (e.g., usable, feasible, relevant, and/or unusable, infeasible, or irrelevant) according to other counterfactual explanations in the cluster.

In some implementations, the relevance score may be determined based on a confidence score associated with clustering the plurality of counterfactual explanations and a confidence score associated with the prediction output (e.g., a confidence level associated with indicating that the user is not qualified). For example, the classification model may determine relevance scores (RS) for one or more unlabeled counterfactual explanations according to the following scoring system:

$$RS = \alpha \times \text{Cluster}_{confidence} + \beta \times \text{Qualification}_{confidence} \quad (1)$$

where $\alpha$ and $\beta$ are configurable weights of the scoring system.

In this way, the classification model may select and provide a counterfactual explanation to the user (and/or an operator) to permit the counterfactual explanation generation model to receive feedback associated with the counterfactual explanation. Accordingly, rather than requesting feedback on the plurality of counterfactual explanations generated for the prediction output, the counterfactual explanation generation model may select a subset of the plurality of counterfactual explanations (e.g., a subset that corresponds to a most relevant to training and/or updating the counterfactual explanation generation model), thereby conserving resources relative to previous techniques.

As shown in FIG. 1C, and by reference number 130, the counterfactual explanation generation model receives feedback from the user device. For example, the counterfactual explanation generation model, via the classification model, may receive feedback data that is associated with the request for feedback (e.g., as a response message, a submission of a prompt, and/or the like). Additionally, or alternatively, the counterfactual explanation generation model may receive feedback associated with an operator that is training the counterfactual explanation generation model during the training period.

The feedback data may indicate and/or include a label for the counterfactual explanation. For example, the feedback data may indicate whether the counterfactual explanation is useful or not useful, feasible or infeasible, relevant or irrelevant, and/or the like. Additionally, or alternatively, the feedback data may include a score associated with a scale of one or more labels.

In this way, the counterfactual explanation generation model may receive feedback to permit the counterfactual explanation generation model to update a label of the counterfactual explanation and/or retrain the one or more models according to the label.

As further shown in FIG. 1C, and by reference number 135, the counterfactual explanation generation model updates the labels in the data structures. For example, the automated analysis system may generate and store the counterfactual explanation along with a label determined from the feedback, as a labeled counterfactual explanation. Accordingly, a previously unlabeled counterfactual explanation may be labeled according to the feedback to generate a labeled counterfactual explanation that can be stored in the labeled counterfactual explanation data structure (and/or in a data structure that includes both labeled and unlabeled counterfactual explanations).

In this way, a label of the counterfactual explanation can be updated in the data structure to increase a quantity of labeled counterfactual explanations in the labeled counterfactual explanation data structure.

As further shown in FIG. 1C, and by reference number 140, the automated analysis system retrains the counterfactual explanation generation model according to the feedback. For example, the automated analysis system may retrain the clustering model according to the updated labeled counterfactual explanation data structure. Additionally, or alternatively, the automated analysis system may retrain an SVM of the classification model (e.g., by providing the label from the feedback data, the relevance score, and/or the counterfactual explanation as inputs to the classification model) to permit more relevant counterfactual explanations to be selected for feedback during subsequent analyses of the qualification model.

In this way, the automated analysis system may retrain the counterfactual explanation generation model according to the labeled counterfactual explanations in the labeled counterfactual explanation data structure and/or the unlabeled counterfactual explanations in the unlabeled counterfactual explanation data structure.

As further shown in FIG. 1C, and by reference number 145, the automated analysis system may iterate one or more of the processes described in connection with example 100. For example, the automated analysis system, during a training period, may iteratively receive pairs of user information and a prediction output of the qualification model, iteratively select one or more relevant counterfactual explanations (e.g., using the iteratively updated labels and/or retrained generator model, clustering model, or classification model), iteratively provide the selected counterfactual explanations for feedback, iteratively update labels based on iteratively received feedback data, and iteratively retrain the clustering model and/or the classification model according to the feedback data. In some implementations, each iteration may be associated with a different counterfactual explanation associated with a prediction output and/or a different analysis of different user information associated with different users.

The automated analysis system may iteratively perform the one or more processes until a quantity of counterfactual explanations in the labeled data structure satisfies a threshold and/or a ratio of a quantity of unlabeled data structures to the quantity of labeled data structures that satisfy a threshold. In this way, once a particular quantity or threshold percentage of counterfactual explanations associated with the qualification model are determined (e.g., 75% of counterfactual explanations are labeled, 90% of counterfactual explanations are labeled, 95% of counterfactual explanations are labeled, or the like). The labeled counterfactual explanations may be used to train a machine learning model to determine an optimal counterfactual explanation for a prediction output of the qualification model, as described elsewhere herein.

Accordingly, as described herein, the automated analysis system may use one or more models to efficiently select and provide counterfactual explanations to one or more users (and/or operators) to determine labels for the counterfactual explanations and/or train a model associated with a qualification model. In this way, the automated analysis system, as described herein, may conserve computing resources and/or communication resources that would otherwise be wasted by requesting feedback for irrelevant, infeasible, or not useful counterfactual explanations, processing received feedback associated with such irrelevant, infeasible, or not useful counterfactual explanations, and/or the like.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
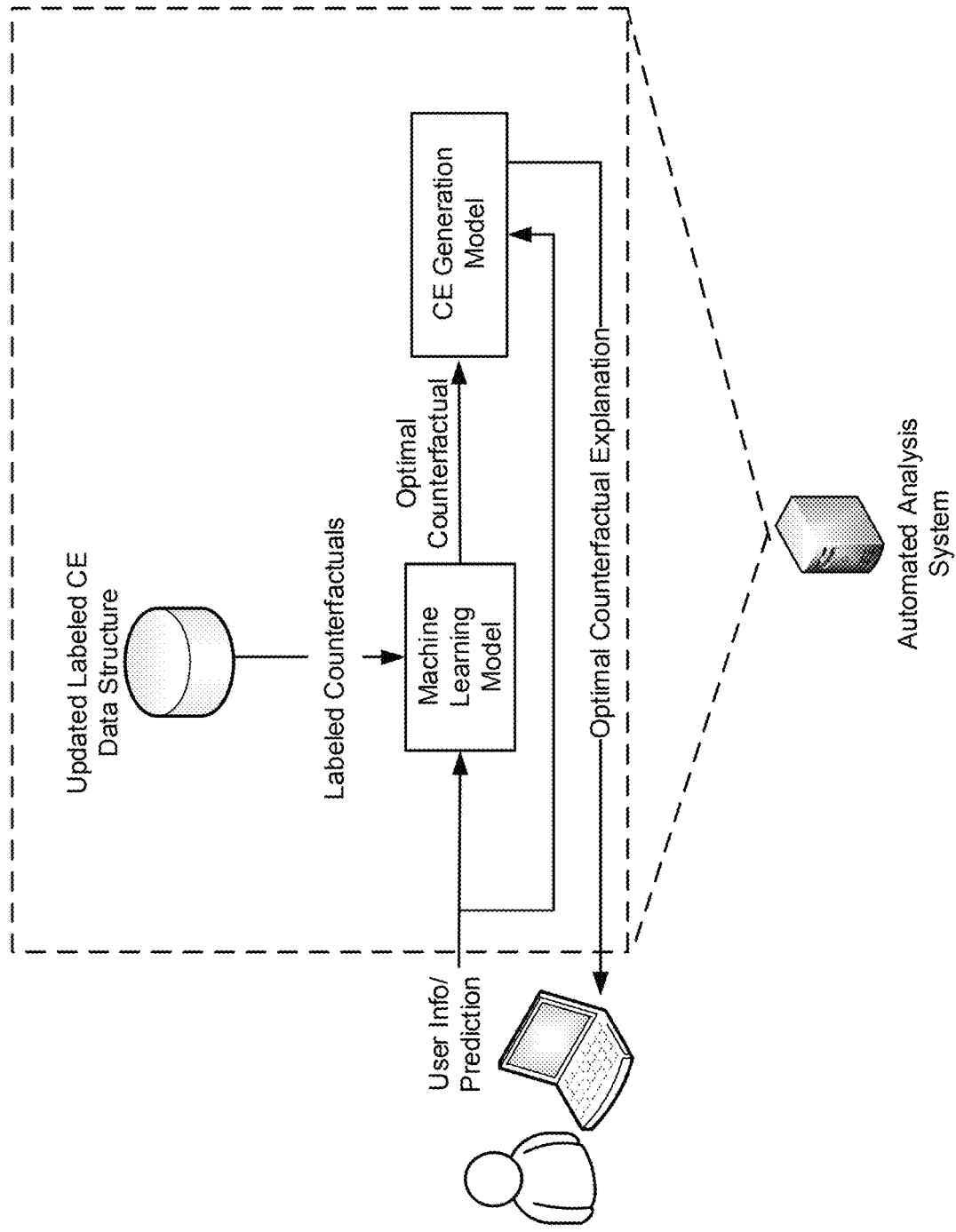
FIG. 2 is a diagram of an example implementation described herein.

FIG. 2 is a diagram of an example 200 associated with generating counterfactual explanations using a machine learning model. As shown in FIG. 2, example 200 includes an automated analysis system (e.g., corresponding to the automated analysis system of example 100) that includes a machine learning model, a counterfactual explanation generation model (e.g., corresponding to the counterfactual explanation of example 100), and the updated labeled counterfactual explanation data structure. As described herein, the machine learning model may include a deep neural network, a generative adversarial network, a sequence-to-sequence learning model, or the like. The machine learning model may be trained as described elsewhere herein (e.g., at least in connection with FIG. 3).

In example 200, the machine learning model may be trained according to the updated labeled counterfactual explanation data structure. For example, the updated labeled counterfactual explanation data structure may be populated with a threshold quantity and/or a threshold percentage of counterfactual explanations that were analyzed during the training period associated with example 100. In this way, once the updated labeled counterfactual explanation data structure includes a desired quantity of labeled counterfactual explanations, the automated analysis system can be configured to train and/or utilize the machine learning model to generate optimal counterfactuals. The optimal counterfactuals can be provided to the counterfactual explanation generation model so that a counterfactual explanation corresponding to the optimal counterfactual (e.g., an optimal counterfactual explanation) can be output to a user.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
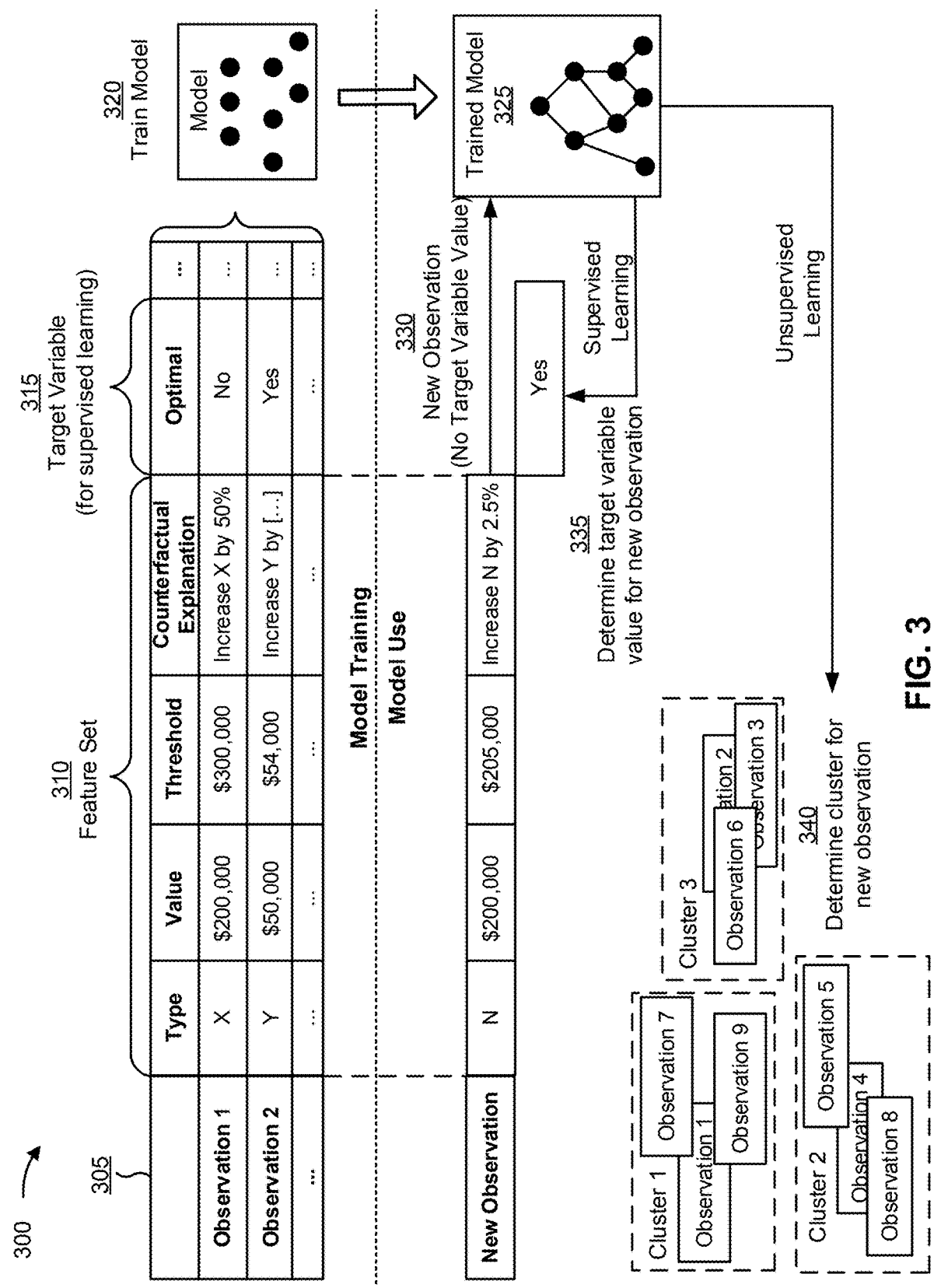
FIG. 3 is a diagram of an example of training and using a machine learning model in connection with generating counterfactual explanations as described herein.

FIG. 3 is a diagram illustrating an example 300 of training and using a machine learning model in connection with generating counterfactual explanations. The machine learning model training and usage described herein may be performed using a machine learning system. The machine learning system may include or may be included in a computing device, a server, a cloud computing environment, or the like, such as the automated analysis system described in more detail elsewhere herein.

As shown by reference number 305, a machine learning model may be trained using a set of observations. The set of observations may be obtained from historical data, such as training data gathered during one or more processes described herein. In some implementations, the machine learning system may receive the set of observations (e.g., as input) from a user device, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the user device. For example, the machine learning system may identify a feature set (e.g., one or more features and/or feature values) by extracting the feature set from structured data, by performing natural language processing to extract the feature set from unstructured data, and/or by receiving input from a user of the user device.

As an example, a feature set for a set of observations may include a first feature of a type of variable, a second feature of a variable value, a third feature of a threshold, a fourth feature of a counterfactual explanation, and so on. As shown, for a first observation, the first feature may have a value of "X," the second feature may have a value of "$200,000," the third feature may have a value of "$300,000," the fourth feature may have a value of "Increase X by 50%," and so on. As shown, for a second observation, the first feature may have a value of "Y," the second feature may have a value of "$50,000," the third feature may have a value of "$54,000," the fourth feature may have a value of "Increase Y by [ . . . ]," and so on. More specifically, the "[ . . . ]" may include a description of an action that can be performed to qualify (e.g., increase the variable value of "Y" by $4000 to $54,000 and/or amend the user data to include an indication of availability of $54,000 from another individual (e.g., a guarantor)). These features and feature values are provided as examples and may differ in other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is an Optimal indicator, which has a value of "Yes" for the first observation and a value of "No" for the second observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model (e.g., a supervised classification model).

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of "N," a second feature of "$200,000," a third feature of "205,000," a fourth feature of "Increase N by 2.5%," and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of "Yes" for the optimal target variable for the new observation, as shown by reference number 335. Based on this prediction, the machine learning system may provide a recommendation, may provide output for determination of a recommendation, may perform an automated action, and/or may cause an automated action to be performed (e.g., by instructing another device to perform the automated action), among other examples. The recommendation may include, for example, one or more counterfactual explanations determined by the machine learning system, as described herein. Such an automated action may include, for example, determining offers associated with assisting a user with satisfying one or more thresholds associated with a counterfactual explanation, providing the offers to a user device to facilitate a transaction (e.g., or application) associated with the one or more offers, identifying missing information associated with a user that was not provided in user information, and/or the like.

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a most optimal counterfactual explanation cluster), then the machine learning system may provide a recommendation, such as the recommendation described above. Additionally, or alternatively, the machine learning system may perform an automated action and/or may cause an automated action to be performed (e.g., by instructing another device to perform the automated action) based on classifying the new observation in the first cluster, such as the automated action described above.

As another example, if the machine learning system were to classify the new observation in a second cluster (e.g., a least optimal counterfactual explanation), then the machine learning system may provide a different recommendation (e.g., a response that does not include a counterfactual explanation) and/or may perform or cause performance of a different automated action, such as providing information associated with considering qualification for services or products associated with other automated analysis systems.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determine and/or provide counterfactual explanations associated with a qualification model. The machine learning system enables recognition and/or identification of tens, hundreds, thousands, or millions of features and/or feature values for tens, hundreds, thousands, or millions of observations, thereby increasing accuracy and consistency and reducing delay associated with determining optimal counterfactual explanations associated with a qualification model, relative to requiring computing resources to be allocated for tens, hundreds, or thousands of operators to manually select and/or analyze counterfactual explanations using the features or feature values.

As indicated above, FIG. 3 is provided as an example. Other examples may differ from what is described in connection with FIG. 3.

Figure 4:
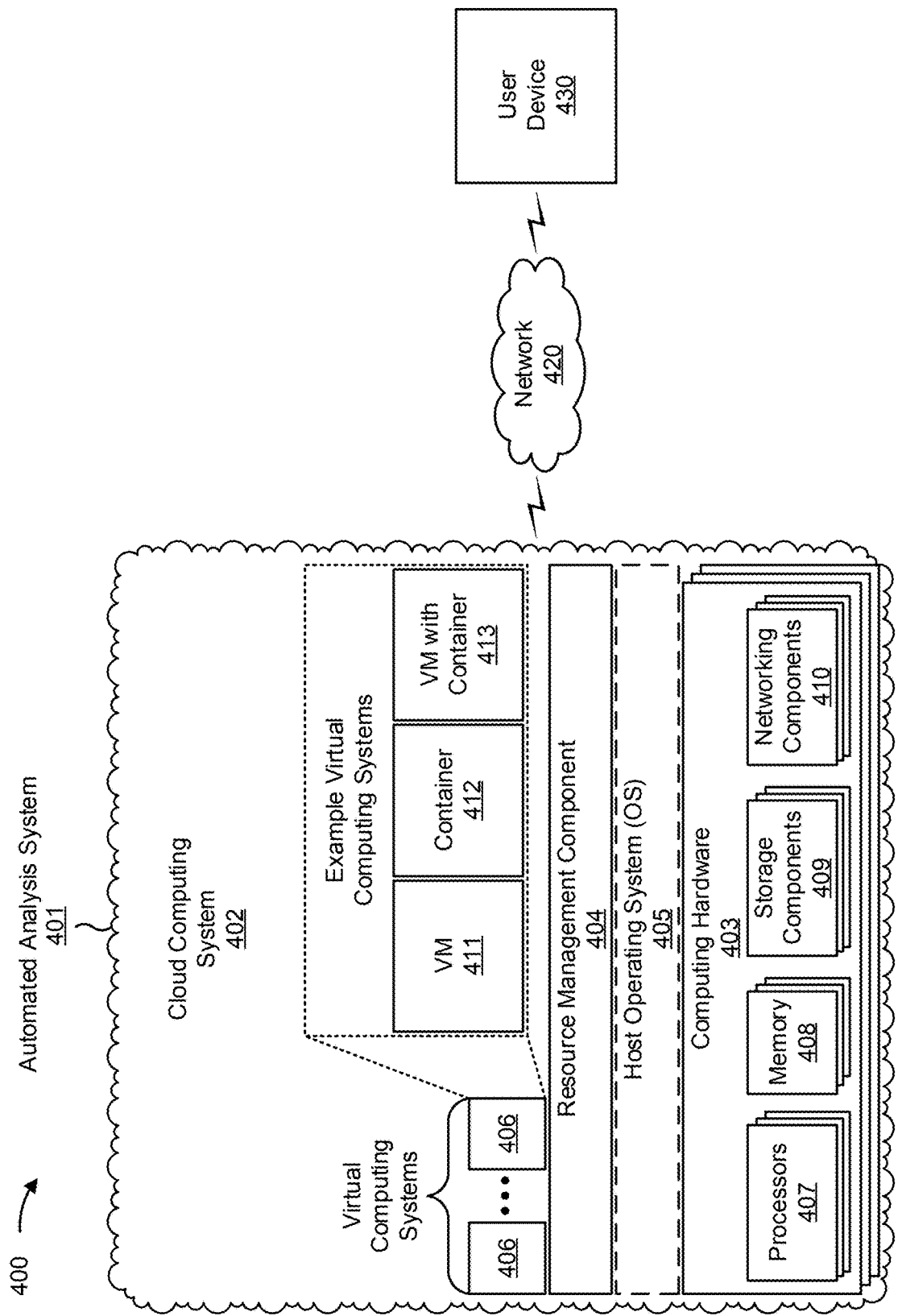
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a automated analysis system 401, which may include one or more elements of and/or may execute within a cloud computing system 402. The cloud computing system 402 may include one or more elements 403-413, as described in more detail below. As further shown in FIG. 4, environment 400 may include a network 420, and/or a user device 430. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the automated analysis system 401 may include one or more elements 403-413 of the cloud computing system 402, may execute within the cloud computing system 402, and/or may be hosted within the cloud computing system 402, in some implementations, the automated analysis system 401 may not be cloud-based (e.g., may be implemented outside of a cloud computing system) or may be partially cloud-based. For example, the automated analysis system 401 may include one or more devices that are not part of the cloud computing system 402, such as device 500 of FIG. 5, which may include a standalone server or another type of computing device. The automated analysis system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

The user device 430 includes one or more devices capable of receiving, generating, storing, processing, and/or providing information associated with user information and/or a qualification model to obtain one or more counterfactual explanations, as described elsewhere herein. The user device 430 may include a communication device and/or a computing device. For example, the user device 430 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 430 may communicate with one or more other devices of environment 400, as described elsewhere herein. The user device may be associated with a user (e.g., an individual that provides user information to a qualification model to attempt to qualify for a service or product) and/or an operator (e.g., an individual associated with the automated analysis system that is configured to train the counterfactual explanation generation model and/or a machine learning model of the automated analysis system, as described herein).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
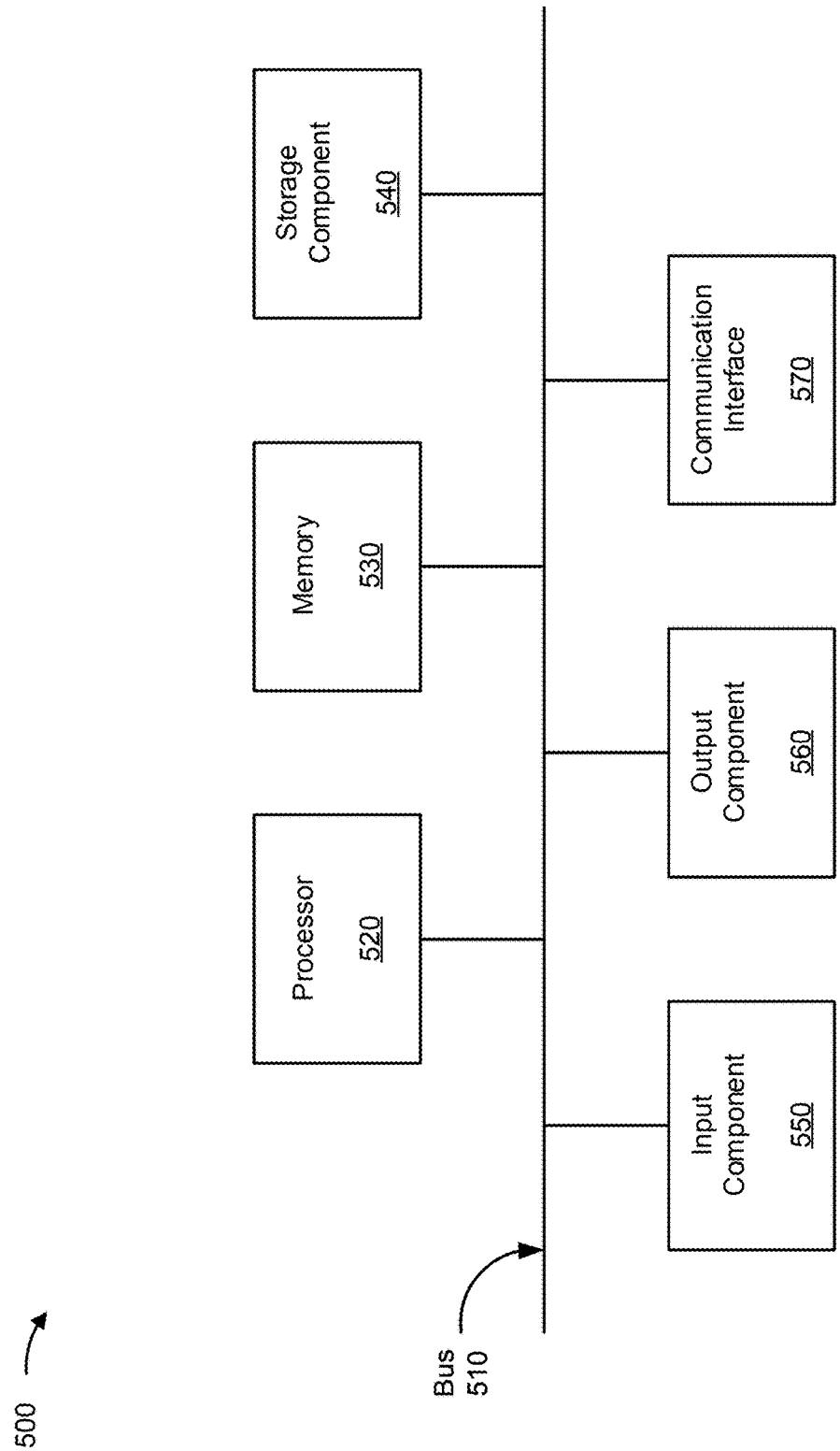
FIG. 5 is a diagram of example components of one or more devices of FIG. 4.

FIG. 5 is a diagram of example components of a device 500, which may correspond to the automated analysis system 401 and/or the user device 430. In some implementations, the automated analysis system 401 and/or the user device 430 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
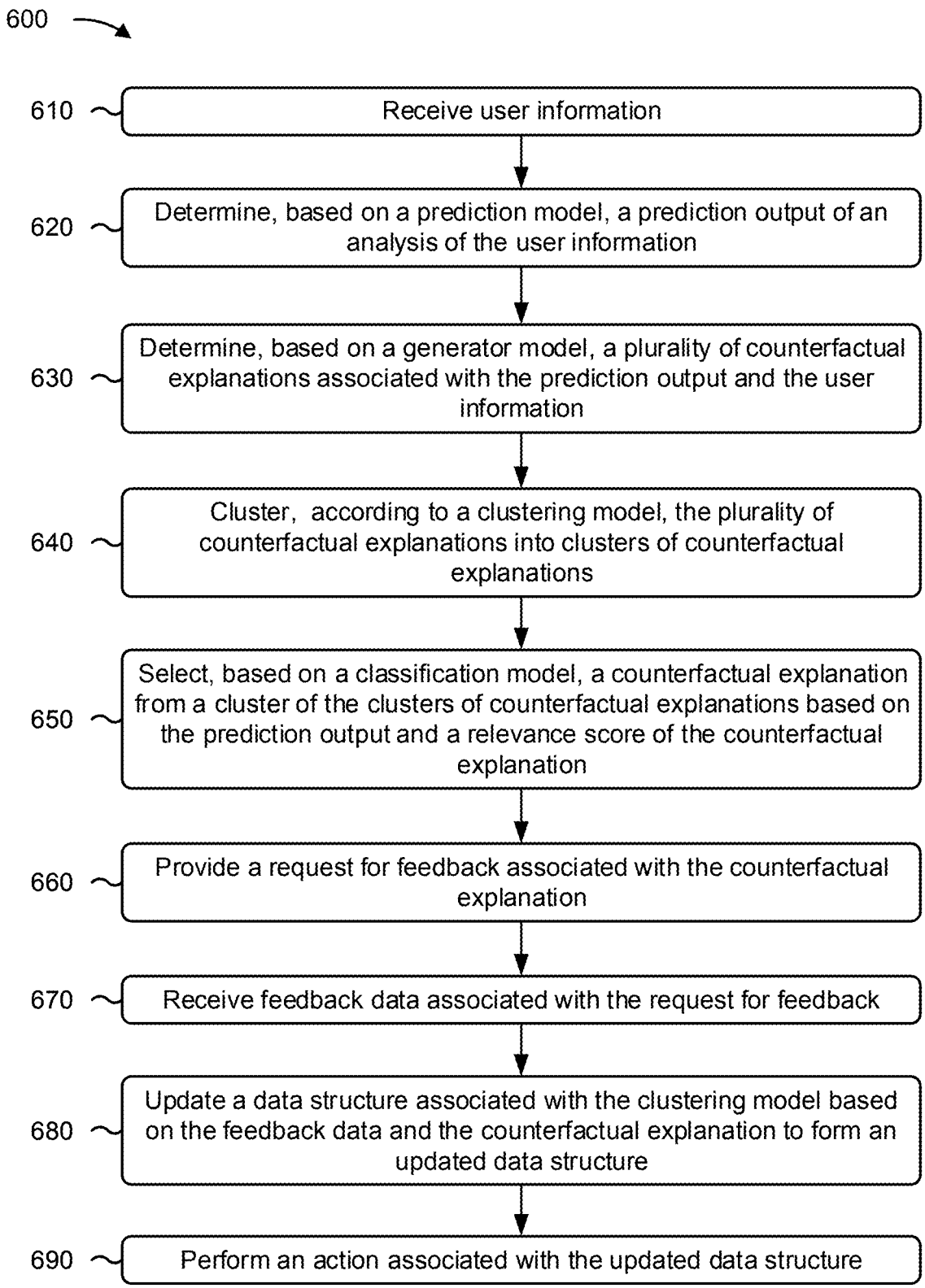
FIG. 6 is a flowchart of an example process relating to generating counterfactual explanations using artificial intelligence and machine learning techniques.

FIG. 6 is a flowchart of an example process 600 associated with generation of counterfactual explanations using artificial intelligence and machine learning techniques. In some implementations, one or more process blocks of FIG. 6 may be performed by an automated analysis system (e.g., automated analysis system 401). In some implementations, one or more process blocks of FIG. 6 may be performed by another device or a group of devices separate from or including the automated analysis system, such as a user device (e.g., user device 430. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving user information (block 610). For example, the automated analysis system may receive user information, as described above.

As further shown in FIG. 6, process 600 may include determining, based on a prediction model, a prediction output of an analysis of the user information (block 620). For example, the automated analysis system may determine, based on a prediction model, a prediction output of an analysis of the user information, as described above.

As further shown in FIG. 6, process 600 may include determining, based on a generator model, a plurality of counterfactual explanations associated with the prediction output and the user information (block 630). For example, the automated analysis system may determine, based on a generator model, a plurality of counterfactual explanations associated with the prediction output and the user information, as described above. In some implementations, the generator model is trained based on a plurality of labeled counterfactuals associated with historical outputs of the analysis.

As further shown in FIG. 6, process 600 may include clustering, according to a clustering model, the plurality of counterfactual explanations into clusters of counterfactual explanations (block 640). For example, the automated analysis system may cluster, according to a clustering model, the plurality of counterfactual explanations into clusters of counterfactual explanations, as described above.

As further shown in FIG. 6, process 600 may include selecting, based on a classification model, a counterfactual explanation from a cluster of the clusters of counterfactual explanations based on the prediction output and a relevance score of the counterfactual explanation (block 650). For example, the automated analysis system may select, based on a classification model, a counterfactual explanation from a cluster of the clusters of counterfactual explanations based on the prediction output and a relevance score of the counterfactual explanation, as described above. In some implementations, the relevance score is determined based on the user information and a confidence score associated with the clustering of the plurality of counterfactual explanations and/or a confidence score associated with the prediction model.

As further shown in FIG. 6, process 600 may include providing a request for feedback associated with the counterfactual explanation (block 660). For example, the automated analysis system may provide a request for feedback associated with the counterfactual explanation, as described above.

As further shown in FIG. 6, process 600 may include receiving feedback data associated with the request for feedback (block 670). For example, the automated analysis system may receive feedback data associated with the request for feedback, as described above.

As further shown in FIG. 6, process 600 may include updating a data structure associated with the clustering model based on the feedback data and the counterfactual explanation to form an updated data structure (block 680). For example, the automated analysis system may update a data structure associated with the clustering model based on the feedback data and the counterfactual explanation to form an updated data structure, as described above.

As further shown in FIG. 6, process 600 may include performing an action associated with the updated data structure (block 690). For example, the automated analysis system may perform an action associated with the updated data structure, as described above.

Process 600 may include additional implementations, such as any single implementation or any combination of implementations described below and/or in connection with one or more other processes described elsewhere herein.

In a first implementation, the prediction output corresponds to a prediction that is representative of a probability that a vector associated with the user information satisfies a threshold vector determined by the prediction model based on the analysis, wherein the plurality of counterfactual explanations correspond to counterfactuals that prevented the vector from satisfying the threshold vector.

In a second implementation, the clustering model is configured to use a k-means nearest neighbor technique to cluster the plurality of counterfactual explanations into the clusters of the counterfactual explanations. In a third implementation, the classification model is configured to use a support vector machine classifier to select the one or more counterfactual explanations based on the prediction output and the relevance score.

In a fourth implementation, selecting the one or more counterfactual explanations comprises determining respective relevance scores of counterfactual explanations in the cluster, and selecting the one or more counterfactual explanations based on the relevance score indicating, relative to other relevance scores of other counterfactual explanations in the cluster, that the one or more counterfactual explanations are more relevant to updating the clustering model than the other counterfactual explanations.

In a fifth implementation, process 600 includes prior to updating the data structure, determining respective labels for the selected one or more counterfactual explanations based on the feedback data, and adding the selected one or more counterfactual explanations and the respective labels to the data structure as corresponding labeled counterfactual explanations.

In a sixth implementation, the data structure includes labeled counterfactual explanations and unlabeled counterfactual explanations, and performing the action comprises determining that a ratio associated with a quantity of the labeled counterfactual explanations and a quantity of the unlabeled counterfactual explanations satisfies a threshold ratio, and training, based on the ratio satisfying the threshold ratio, a supervised classification machine learning model based on the updated data structure. In a seventh implementation, process 600 includes receiving other user information and another output associated with another analysis of the other user information, generating, based on the trained machine learning model, another counterfactual explanation that is associated with the other output, and providing, to a user device that provided the other user information, the other counterfactual explanation to indicate context for the other output.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, user information, wherein the user information includes data associated with an entity;
   determining, by the device and based on a prediction model, a prediction output of an analysis of the user information,
      wherein the prediction output indicates a probability associated with the entity failing to satisfy a set of criteria;
   generating, by the device and based on a generator model, data representative of counterfactuals of parameters of the user information;
   utilizing, by the device and based on the generator model, vector conversion to convert the data representative of the counterfactuals of the parameters of the user information into a plurality of counterfactual explanations associated with the prediction output and the user information,
      wherein each counterfactual explanation, of the plurality of counterfactual explanations, describes a respective scenario that would enable the entity to satisfy the set of criteria, and
      wherein the generator model is trained based on a plurality of labeled counterfactuals associated with historical outputs of the analysis;
   clustering, by the device and according to a clustering model, the plurality of counterfactual explanations into clusters of counterfactual explanations;
   selecting, by the device and based on a classification model, one or more counterfactual explanations from a cluster of the clusters of counterfactual explanations based on the prediction output and a relevance score of the selected one or more counterfactual explanations,
      wherein the relevance score is determined based on the user information and a confidence score associated with the clustering of the plurality of counterfactual explanations and a confidence score associated with the prediction model;
   providing, by the device, a request for feedback associated with the selected one or more counterfactual explanation;
   receiving, by the device, feedback data associated with the request for feedback;
   updating, by the device, a data structure associated with the clustering model based on the feedback data and the counterfactual explanation to form an updated labeled counterfactual explanation data structure,
   populating, by the device, the updated labeled counterfactual explanation data structure with at least a threshold quantity and a threshold percentage of counterfactual explanations associated with historical outputs of the analysis,
   training, by the device, a machine learning model to generate a trained machine learning model based on the updated labeled counterfactual explanation data structure including a desired quantity of labeled counterfactual explanations,
   generating, by the device, using the trained machine learning model, optimal counterfactual explanations for subsequent prediction outputs of the prediction model based on the updated labeled counterfactual explanation data structure; and
   performing, by the device, one or more actions associated with the updated labeled counterfactual explanation data structure based on the optimal counterfactual explanations.

2. The method of claim 1, wherein the prediction output corresponds to a prediction that is representative of a probability that a vector associated with the user information satisfies a threshold vector determined by the prediction model based on the analysis,
   wherein the plurality of counterfactual explanations correspond to counterfactuals that prevented the vector from satisfying the threshold vector.

3. The method of claim 1, wherein the clustering model is configured to use a k-means nearest neighbor technique to cluster the plurality of counterfactual explanations into the clusters of the counterfactual explanations.

4. The method of claim 1, wherein the classification model is configured to use a support vector machine classifier to select the one or more counterfactual explanations based on the prediction output and the relevance score.

5. The method of claim 1, wherein selecting the one or more counterfactual explanations comprises:
   determining respective relevance scores of counterfactual explanations in the cluster; and
   selecting the one or more counterfactual explanations based on the relevance score indicating, relative to other relevance scores of other counterfactual explanations in the cluster, that the one or more counterfactual explanations are more relevant to updating the clustering model than the other counterfactual explanations.

6. The method of claim 1, further comprising:
prior to updating the data structure, determining respective labels for the selected one or more counterfactual explanations based on the feedback data; and
adding the selected one or more counterfactual explanations and the respective labels to the data structure as corresponding labeled counterfactual explanations.

7. The method of claim 1, wherein the updated labeled counterfactual explanation data structure includes labeled counterfactual explanations and unlabeled counterfactual explanations, and performing the action comprises:
determining that a ratio associated with a quantity of the labeled counterfactual explanations and a quantity of the unlabeled counterfactual explanations satisfies a threshold ratio; and
training, based on the ratio satisfying the threshold ratio, a supervised classification machine learning model based on the updated labeled counterfactual explanation data structure.

8. The method of claim 7, further comprising:
receiving other user information and another output associated with another analysis of the other user information;
generating, based on the trained supervised classification machine learning model, another counterfactual explanation that is associated with the other output; and
providing, to a user device that provided the other user information, the other counterfactual explanation to indicate context for the other output.

9. A device, comprising:
one or more memories; and
one or more processors, communicatively coupled to the one or more memories, configured to:
receive user information and a prediction output of an analysis of the user information,
wherein the user information includes data associated with an entity, and
wherein the prediction output indicates a probability associated with the entity failing to satisfy a set of criteria;
generate, based on the user information and the prediction output, data representative of counterfactuals of parameters of the user information;
utilize vector conversion to convert the data representative of the counterfactuals of the parameters of the user information into a plurality of counterfactual explanations associated with the prediction output,
wherein each counterfactual explanation, of the plurality of counterfactual explanations, describes a respective scenario that would enable the entity to satisfy the set of criteria;
cluster, according to a clustering model, the plurality of counterfactual explanations into clusters of counterfactual explanations;
identify, in a cluster of the clusters of counterfactual explanations, an unlabeled counterfactual explanation;
determine, based on a classification model, a relevance score of the unlabeled counterfactual explanation based on the user information and a confidence score associated with the cluster;
select, based on the relevance score satisfying a relevance threshold, the unlabeled counterfactual explanation for updating the clustering model;
provide the unlabeled counterfactual explanation to a user device;
receive, from the user device, feedback data associated with the unlabeled counterfactual explanation;
generate a labeled counterfactual explanation that is based on the feedback data and the unlabeled counterfactual explanation;
update a data structure associated with the clustering model based on the feedback data and the counterfactual explanation to form an updated labeled counterfactual explanation data structure;
populate the updated counterfactual explanation data structure with at least a threshold quantity and a threshold percentage of counterfactual explanations associated with historical outputs of the analysis;
train a machine learning model to generate a trained machine learning model based on the updated labeled counterfactual explanation data structure including a desired quantity of labeled counterfactual explanations;
generate, using the trained machine learning model, optimal counterfactual explanations for subsequent prediction outputs of the prediction model based on the updated labeled counterfactual explanation data structure; and
perform one or more actions associated with the updated labeled counterfactual explanation data structure based on the optimal counterfactual explanations.

10. The device of claim 9, wherein the analysis is associated with a prediction model and the prediction output corresponds to a prediction that is representative of a probability that a vector associated with the user information satisfies a threshold vector determined by the prediction model,
wherein the plurality of counterfactual explanations correspond to counterfactuals that prevented the vector from satisfying the threshold vector.

11. The device of claim 9, wherein the plurality of counterfactual explanations are generated by a generator model that is trained based on a plurality of historical labeled counterfactual explanations associated with the prediction output.

12. The device of claim 9, wherein the clustering model is configured to use a k-means nearest neighbor technique to cluster the plurality of counterfactual explanations into a first cluster of unlabeled counterfactual explanations and a second cluster of counterfactual explanations.

13. The device of claim 9, wherein the one or more processors, when selecting the unlabeled counterfactual explanation, are configured to:
determine respective relevance scores of unlabeled counterfactual explanations in the cluster; and
select the unlabeled counterfactual explanation based on the relevance score of the unlabeled counterfactual explanation indicating, relative to another relevance score of another unlabeled counterfactual explanation in the cluster, that the unlabeled counterfactual explanation is more relevant to updating the clustering model than the other unlabeled counterfactual explanation.

14. The device of claim 9, wherein the one or more processors, when performing the action, are configured to least one of:
update the clustering model based on the labeled counterfactual explanation; and
train a support vector machine classifier of the classification model based on the labeled counterfactual explanation.

15. A non-transitory computer-readable medium storing a set of instructions, the set of instructions comprising:
one or more instructions that, when executed by one or more processors of a device, cause the device to:

receive training data associated with determining a label for a counterfactual explanation that is associated with an analysis of a prediction model,
wherein a training set of the training data includes first user information and a first prediction output of the prediction model that is based the first user information,
wherein the first user information is associated with a first user, and
wherein the first prediction output indicates a probability associated with the first user failing to satisfy a set of criteria;
determine, based on the training set, a labeled counterfactual explanation associated with the first prediction output, wherein the one or more instructions that, when executed by the one or more processors of the device, cause the device to determine the labeled counterfactual explanation associated with the first prediction output further cause the device to:
generate, based on the first user information, data representative of counterfactuals of parameters of the first user information;
utilize vector conversion to convert the data representative of the counterfactuals of the parameters of the first user information into a plurality of counterfactual explanations associated with the first prediction output,
wherein each counterfactual explanation, of the plurality of counterfactual explanations, describes a respective scenario that would enable the first user to satisfy the set of criteria,
cluster, according to a clustering model, the plurality of counterfactual explanations into clusters,
determine, according to a classification model, a relevance score of a counterfactual explanation based on a confidence score of the first prediction output and a cluster of the counterfactual explanation,
obtain feedback data associated with the counterfactual explanation, and
label, based on the feedback data, the counterfactual explanation to generate the labeled counterfactual explanation;
update a data structure associated with the clustering model based on the feedback data and the counterfactual explanation to form an updated labeled counterfactual explanation data structure;
populate the updated counterfactual explanation data structure with at least a threshold quantity and a threshold percentage of counterfactual explanations associated with historical outputs of the analysis;
train a machine learning model to generate a trained machine learning model based on the updated labeled counterfactual explanation data structure including a desired quantity of labeled counterfactual explanations;
generate, using the trained machine learning model, optimal counterfactual explanations for subsequent prediction outputs of the prediction model based on the updated labeled counterfactual explanation data structure;
receive, from a user device, second user information and a second prediction output of the prediction model;
determine the optimal counterfactual explanations according to the trained machine learning model; and
provide, to the user device, the optimal counterfactual explanations.

16. The non-transitory computer-readable medium of claim 15, wherein the first prediction output corresponds to a prediction that is representative of a probability, determined by the prediction model, that a vector associated with the first user information satisfies a threshold vector,
wherein the plurality of counterfactual explanations corresponds to counterfactuals that prevented the vector from satisfying the threshold vector.

17. The non-transitory computer-readable medium of claim 15, wherein the machine learning model comprises at least one of:
a deep neural network,
a generative adversarial network, or
a sequence-to-sequence learning model.

18. The non-transitory computer-readable medium of claim 15, wherein the clustering model is configured to use a k-means nearest neighbor technique to cluster the plurality of counterfactual explanations into the clusters.

19. The non-transitory computer-readable medium of claim 15, wherein the classification model is configured to use a support vector machine classifier to select, based on the first prediction output and the confidence score, the counterfactual explanation to be analyzed in association with the feedback data.

20. The non-transitory computer-readable medium of claim 19, wherein the support vector machine classifier is trained based on reference labeled counterfactual explanations in the updated labeled counterfactual explanation data structure.

* * * * *